United States Patent [19]
Nijboer

[11] Patent Number: 5,875,476
[45] Date of Patent: Feb. 23, 1999

[54] FILING SYSTEM FOR MANAGING RECORDING AND RETRIEVING OF INFORMATION

[75] Inventor: Jakob G. Nijboer, Eindhoven, Netherlands

[73] Assignee: U.S. Philips Corporation, New York, N.Y.

[21] Appl. No.: 733,304

[22] Filed: Oct. 17, 1996

[30] Foreign Application Priority Data

Oct. 20, 1995 [EP] European Pat. Off. .............. 95202836

[51] Int. Cl.$^6$ ...................................................... G06F 12/12
[52] U.S. Cl. .......................................... 711/159; 707/205
[58] Field of Search ................................... 711/101, 159; 395/621; 707/205

[56] References Cited

U.S. PATENT DOCUMENTS

| | | | |
|---|---|---|---|
| 5,337,197 | 8/1994 | Brown et al. | 360/48 |
| 5,613,088 | 3/1997 | Achiwa et al. | 711/155 |
| 5,623,470 | 4/1997 | Asthana et al. | 369/58 |

OTHER PUBLICATIONS

"Information Processing—Volume and File Structure of CD–ROM for Information Interchange", International Standard, ISO 9660, 1988.

ISO 9660 'Information Processing—Volume and file structure of CD–ROM for information interchange', corrected edition, Sep. 1988, pp. 1–31.

*Primary Examiner*—Eddie P. Chan
*Assistant Examiner*—Kevin L. Ellis
*Attorney, Agent, or Firm*—Edward Blocker

[57] ABSTRACT

Filing system for managing recording and retrieving of information files on a record carrier of a rewritable type, which have a limited number of overwrites, such as CD-Erasable having a phase-change recording layer. The system includes a unit for generating non-file and file items having management information and a unit for assigning areas on the record carrier for recording the items. The management information includes references indicative of the areas, and the items include at least one item of a first type to be recorded at a predetermined area (e.g., a Primary Volume Descriptor as in ISO 9660) and items of a second type to be recorded at variable areas (e.g., a Path Table and Directory Files). To restrict the number of overwrites, the unit for assigning areas is arranged for assigning areas for items of the second type in such a way that in operational use updated versions of items of the second type are preferably assigned the same area as the original version of the respective item.

18 Claims, 1 Drawing Sheet

FILING SYSTEM FOR MANAGING RECORDING AND RETRIEVING OF INFORMATION

BACKGROUND OF THE INVENTION

The invention relates to a filing system for managing recording and retrieving of information files on a record carrier of a rewritable type, which system comprises means for generating non-file and file items comprising management information and means for assigning areas on the record carrier for recording the items, the management information comprising references indicative for the areas, said items comprising at least one item of a first type to be recorded on a predetermined area and items of a second type to be recorded on variable areas Such a filing system is described in ISO 9660 'Information Processing—Volume and file structure of CD-ROM for information interchange, corrected edition, September 1988'. In this document a filing system for recording and retrieving files on/from a record carrier is defined, which is used for the well known CD-ROM. The file management information is structured in non-file items and file items. The non-file items comprise a Primary Volume Descriptor (PVD), Supplementary Volume Descriptor(s) (SVD), and a Path Table (PT), which contains the addresses of all directory files. The PVD must be on a fixed location on the record carrier, such that a recording system is always able to locate the basic information about the logical structure of the stored information. File items may comprise system information files and directory files. The directory files comprise the addresses of individual files and other directories in so called Directory Records (DREC); the directories forming a hierarchical system starting at a root directory (RD). The PVD and the PT comprise the address of the RD.

For compatibility reasons a similar filing system is needed for recordable and/or erasable record carriers, such as CD-E (Erasable). However the CD-E is based on phase change technology, which allows only a limited number of overwrites (e.g. 1000 times). Therefore the operational life of such a record carrier is limited. A problem may arise relatively early in areas which are frequently overwritten, especially if the area has a fixed location, such as the PVD.

If ISO 9660 was followed explicitly, then the PVD would be rewritten whenever:

1. The root directory address changes. This will occur whenever either a DREC of a file or directory is modified, added to or deleted from the root directory of the volume.
2. The path table is relocated. This will occur whenever a new directory is added anywhere on the volume which causes the path table to grow beyond its currently allocated space. This can also occur on CD-E when the write or the verify after write suggest that the location is either bad or risky.
3. The path table changes size. Whenever a new directory, anywhere on the volume, is added or whenever an old directory, anywhere on the volume, is deleted, the path table changes size.

Note: the above concerns apply equally to the SVD.

The path table PT is the second most likely item to require frequent updates. If ISO 9660 was followed explicitly, then the path table would be rewritten whenever.

1. A directory anywhere on the volume is added.
2. A directory anywhere on the volume is deleted.
3. A directory anywhere on the volume is relocated.
4. The name of a directory anywhere on the volume is changed.

SUMMARY OF THE INVENTION

It is an object of the invention to provide a method of recording and a filing system in which the operational lifespan of record carriers with a limited number of overwrites is extended.

According to a first aspect of the invention this object is achieved with a filing system according to the invention, characterized in that the means for assigning areas are arranged for assigning areas for items of the second type in such a way, that in operational use updated versions of items of the second type are preferably assigned the same area as the original version of the item concerned. This has the effect, that the references to items remain unchanged as long as possible. This has the advantage, that items containing said references, such as the PVD, need almost never be rewritten, when changes in the managed files occur during operational use.

BRIEF DESCRIPTION OF THE DRAWINGS

The invention will now be described in more detail, by way of example, with reference to FIG. 1, in which.

DESCRIPTION OF THE PREFERRED EMBODIMENTS

Figure 1:
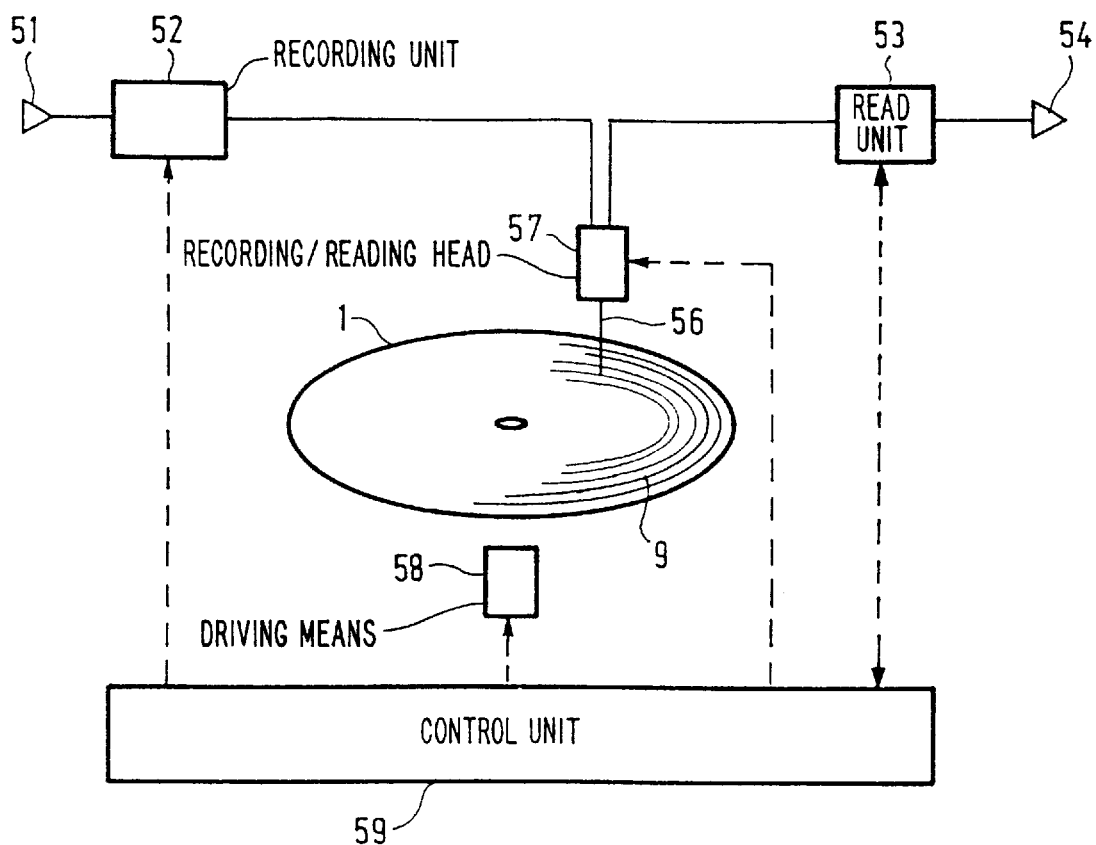
FIG. 1 shows a recording/retrieving system.

FIG. 1 shows a system for recording information on (and retrieving the information from) a record carrier 1 of an inscribable type, e.g. a CD-Erasable (CD-E). The record carrier 1 is rotated by driving means 58. Information from input 51 is formatted in recording unit 52 and written on disc 1 in track 9 by recording/reading head 57 by a beam 56, e.g. a laser beam. The information can be reproduced from disc 1 by reading the track 9 with head 57 and recovering the information from the read signal by read unit 53, which is coupled to output 54. The recording and reproducing takes place under control of a control unit 59. Control unit 59 controls driving means 58 and head 57, and controls formatting/recovering the information in/from files and non-file items as required by the filing system. Control unit 59 is arranged for generating file management information and for assigning areas on the record carrier for file management items and (user) files. On a record carrier an area usually is embodied as an addressable range of recordable sectors. An example of a filing system can be found in the standard ISO 9660, as described in the introductory part. The control unit 59, including the filing system, may be implemented in specific driver electronics included in a CD-E recorder, or it may be (partly) implemented in driver firmware or software in a host computer system to which a CD-E recorder is connected.

In the filing system according to the invention the file management information, which needs to be updated due to changed or new user files, will be recorded in the same area as the previous version of the management information concerned. This is contrary to the practice in computer hard-disc filing systems etc., where updated versions often are written in a different area for error recovery reasons. If a writing error or a unexpected power-down of the systems occurs during writing, the original version will still be intact. In the filing system according to the invention (if error recovery is required) the previous version may be duplicated beforehand to a backup area. As an example for an adapted version of ISO 9660, the way that the path table is relocated is adapted. The path table is a picture of the volume's directory tree. Its purpose is to minimize access time to any file by reducing all accesses to at most 2. This structure will be rewritten based upon the dynamics of the CD-E disc usage. When the Path Table item is to be replaced by an updated version, in a standard ISO 9660 filing system a new location would be selected. The old version will than still be available on the old location. In the filing system according to the invention, the new version will be written on the same location. This has the advantage, that the PVD needs not to be rewritten every time the PT changes.

In a second embodiment of the filing system the path table size in the PVD shall be fixed at a size that is so large that it is not expected to the achieved. The PT comprises records, each record containing the address, name and other information of a directory on the record carrier. The size of PT can be determined by examining the path table itself. For example the path table can be read until a empty or non valid record is encountered. Also for this reason, the free space allocated on the record carrier for the path table shall be fixed at the same fixed large size, that is not expected to the achieved. The recommended value is 65,536 bytes, equalling 32 blocks of 2048 bytes each, 2048 bytes being a usual size of a recoverable data unit (sector) on a CD. This should provide for approximately 2000 PT records. The unused part at the end of the path table shall be zero filled.

Only for the following causes relocation of the PT remains necessary: unreliable write and expansion beyond its currently allocated space. Unreliable write can be determined by analyzing the error correction data; when a significant number of errors occurs (but before the errors cannot be corrected anymore) relocation is executed. As described with the second embodiment the second cause can be minimized by reserving enough space for potential usage. This allocation size is dependent upon the implementation. The recommended size is 65536 bytes (32 blocks).

In an embodiment of the filing system based upon ISO 9660 according to the invention the root directory record in the PVD (or SVD) is not used. The root directory (RD) entry in the PVD (and in the SVD) shall be zero filled. According to ISO 9660 the RD can also be located using the path table PT. This prevents the PVD to be rewritten when the RD needs to be relocated.

Of the three reasons listed for rewriting the PVD, only one remains: relocating the path table. As shown above, relocating the PT is minimized.

In further embodiments of the filing system according to the invention the Root Directory and other directory files can be treated like the Path Table (rewrite updated versions on the same area). This limits the number of rewrites of the PT itself. As the RD might be often changed, assigning a larger area for the RD than the actual size of the RD will enable a frequent re-use of said area before relocating RD is necessary and therefore PT needs to be rewritten.

Reserving a fixed position on the disc near the outer edge (Lead Out) of the disc for (some of the relocatable) file management items will prevent fragmentation of the recordable area. This will also lessen the need for rewriting the management items. Said positions may be allocated during a formatting procedure executed before operational use.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. A filing system for managing recording and retrieving of information files on a record carrier of a rewritable type, said filing system comprising
    means for generating non-file and file items comprising management information; and
    means for assigning areas on the record carrier for recording the non-file and file items;
    the management information comprising references indicative of the assigned areas;
    said non-file and file items comprising at least one item of a first type to be recorded on a predetermined area and items of a second type to be recorded on variable areas, characterized in that the means for assigning areas are arranged for assigning areas for items of the second type such that in operational use updated versions of items of the second type are preferably assigned the same area as the original version of the respective item.

2. The filing system as claimed in claim 1, characterized in that the means for generating non-file and file items are arranged for generating an item comprising duplicated original management information to be recorded on the record carrier before recording an updated version of said item comprising updated management information in the same area as the original version of said item.

3. The filing system as claimed in claim 1, characterized in that, items of the second type comprise a Path Table comprising references to directory files and items of the first type comprise a Primary Volume Descriptor having a reference indicative of the area comprising the Path Table, and the means for assigning areas are arranged to assign an area having a size of about 64 kbyte to the Path Table.

4. The filing system as claimed in claim 1, characterized in that, while a predetermined item of the first type and a predetermined item of the second type are each intended to comprise a reference to a Root Directory, the means for generating non-file and file items are arranged to assign a predetermined value to said reference in the item of the first type, said predetermined value indicating that said reference is not used.

5. The filing system as claimed in claim 4, characterized in that the means for generating non-file and file items are arranged for generating an item comprising duplicated original management information to be recorded on an updated version of said record carrier before recording the item comprising updated management information in the same area as the original version of the respective item.

6. The filing system as claimed in claim 1, characterized in that the means for assigning areas are arranged to assign to a version of an item of the second type an area having a size substantially larger than the actual size of said version when an area is to be assigned to said item for the first time.

7. The filing system as claimed in claim 6, characterized in that the means for generating non-file and file items are arranged for generating an item comprising duplicated original management information to be recorded on the record carrier before recording an updated version of said item comprising updated management information in the same area as the original version of said item.

8. The filing system as claimed in claim 6, characterized in that, while items of the second type comprise a Path Table comprising references to directory files and items of the first type comprise a Primary Volume Descriptor having a reference indicative for the area comprising the Path Table, the means for assigning areas are arranged for assigning an area having a size of about 64 kbyte to the Path Table.

9. The filing system as claimed in claim 6, characterized in that, while a predetermined item of the first type and a predetermined item of the second type are each intended to comprise a reference to a Root Directory, the means for generating non-file and file items are arranged to assign a predetermined value to said reference in the item of the first type, said predetermined value indicating that said reference is not used.

10. The filing system as claimed in claim 9, characterized in that the means for generating non-file and file items are arranged for generating an item comprising duplicated original management information to be recorded on an updated version of said record carrier before recording the item comprising updated management information in the same area as the original version of the respective item.

11. A recording system comprising means for writing and reading information on a record carrier of a rewritable type, characterized in that the recording system comprises a filing system for managing recording and retrieving of information files on a record carrier of a rewritable type, said filing system comprising means for generating non-file and file items comprising management information; and means for assigning areas on the record carrier for recording the non-file and file items; the management information comprising references indicative of the assigned areas; said non-file and file items comprising at least one item of a first type to be recorded on a predetermined area and items of a second type to be recorded on variable areas, characterized in that the means for assigning areas are arranged for assigning areas for items of the second type such that in operational use updated versions of items of the second type are preferably assigned the same area as the original version of the respective item.

12. The recording system as claimed in claim 11 wherein the means for assigning are arranged for assigning to a version of an item of the second type an area having a size substantially larger than the actual size of the respective version when the area is to be assigned to the respective item for the first time.

13. The recording system as claimed in claim 11, wherein when a predetermined item of the first type and a predetermined item of the second type are each intended to comprise a reference to a Root Directory, the means for generating non-file and file items are arranged to assign a predetermined value to said reference in the item of the first type, said predetermined value indicating that said reference is not used.

14. The recording system as claimed in claim 11, wherein the means for generating non-file and file items are arranged for generating an item comprising duplicated original management information to be recorded on an updated version of said record carrier before recording the item comprising updated management information in the same area as the original version of said respective item.

15. The recording system as claimed in claim 11, wherein the means for assigning areas are arranged for assigning to a version of an item of the second type an area having a size substantially larger than the actual size of the respective version when the area has to be assigned to the respective item for the first time and when a predetermined item of the first type and a predetermined item of the second type are each intended to comprise a reference to a Root Directory, the means for generating non-file and file items are arranged to assign a predetermined value to said reference in the item of the first type, said predetermined value indicating that said reference is not used.

16. The recording system as claimed in claim 11, wherein the means for assigning areas are arranged for assigning to a version of an item of the second type an area having a size substantially larger than the actual size of the respective version when the area has to be assigned to the respective item for the first time and wherein the means for generating non-file and file items are arranged for generating an item comprising duplicated original management information to be recorded on the record carrier before recording an updated version of said item comprising updated management information in the same area as the original version of said item.

17. The recording system as claimed in claim 11, wherein when a predetermined item of the first type and a predetermined item of the second type are intended to comprise a reference to a Root Directory, the means for generating non-file and file items are arranged for assigning a predetermined value to said reference in the item of the first type, said predetermined value indicating that said reference is not used and wherein the means for generating non-file and file items are arranged for generating an item comprising duplicated original management information to be recorded on the record carrier before recording the item comprising updated management information in the same area as the original version of the respective item.

18. The recording system as claimed in claim 11, wherein the means for assigning areas are arranged for assigning to a version of an item of the second type an area having a size substantially larger than the actual size of the respective version when the area has to be assigned to the respective item for the first time and when a predetermined item of the first type and a predetermined item of the second type are intended to comprise a reference to a Root Directory, the means for generating non-file and file items are arranged for assigning a predetermined value to said reference in the item of the first type, said predetermined value indicating that said reference is not used and wherein the means for generating non-file and file items are arranged for generating an item comprising duplicated original management information to be recorded on the record carrier before recording the item comprising updated management information in the same area as the original version of the respective item.

* * * * *

UNITED STATES PATENT AND TRADEMARK OFFICE
CERTIFICATE OF CORRECTION

PATENT NO.   : 5,875,476
DATED        : February 23, 1999
INVENTOR(S)  : Jakob G. Nijboer It is certified that error appears in the above-identified patent and that said Letters Patent is hereby corrected as shown below:

Column 6,
Line 2, delete "respective".

Signed and Sealed this

Twelfth Day of November, 2002

Attest:

Attesting Officer

JAMES E. ROGAN
*Director of the United States Patent and Trademark Office*